Feb. 8, 1944.  J. O'BYRNE  2,341,234
ARTIFICIAL FISH LURE
Filed Aug. 18, 1943
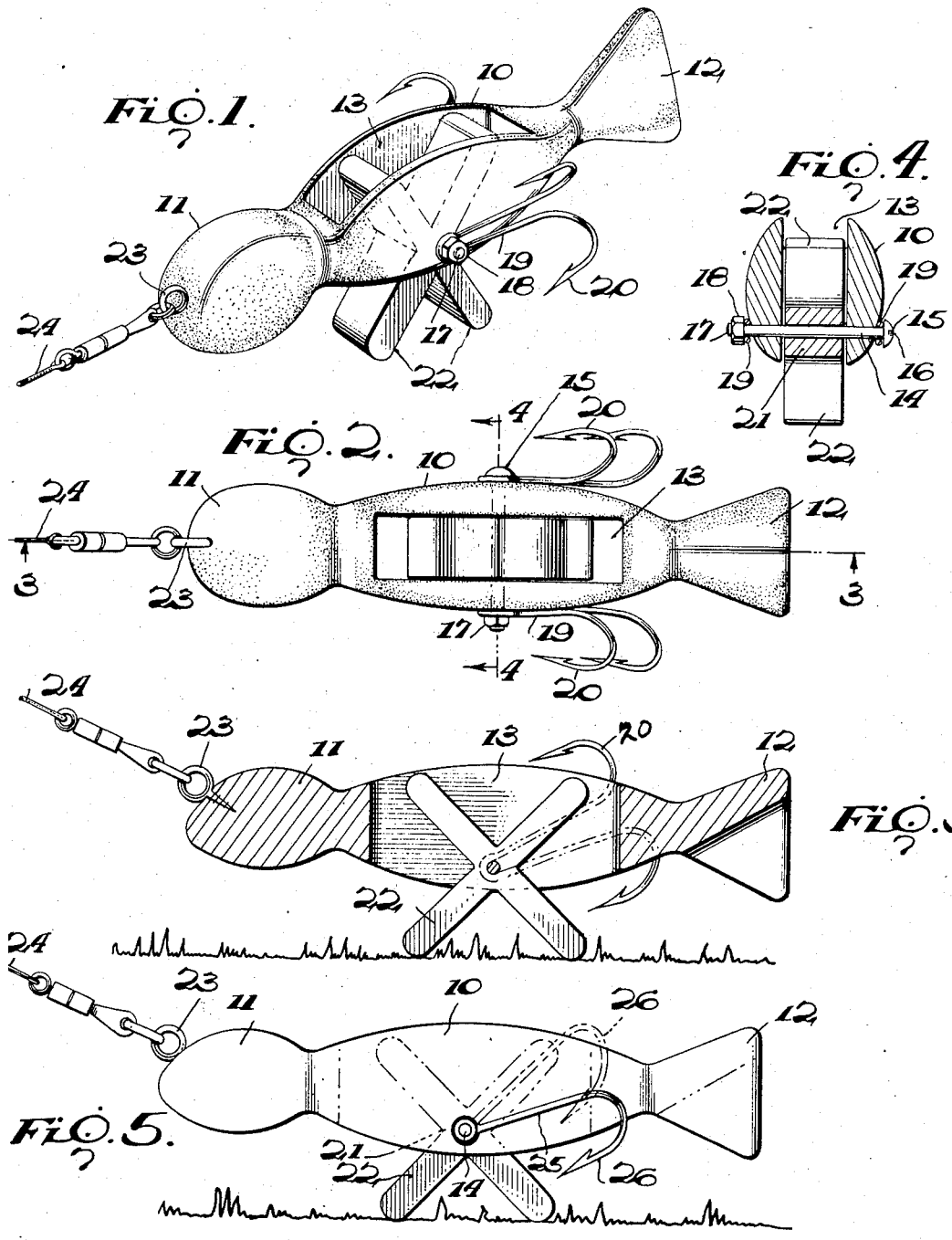
Inventor
Joseph O'Byrne.
By Cushman Darby & Cushman
Attorneys Patented Feb. 8, 1944

2,341,234

UNITED STATES PATENT OFFICE 2,341,234

ARTIFICIAL FISH LURE

Joseph O'Byrne, Philadelphia, Pa.

Application August 18, 1943, Serial No. 499,133

6 Claims. (Cl. 43—42)

The present invention relates to an artificial fish lure and more particularly to a bait constructed and arranged to simulate a bird or the like fluttering in the water.

From close observation I have found that fish in certain localities go after fledglings that fall from their nests in trees whose branches extend over the water. Accordingly, an important feature of the invention is to provide a simple, efficient and attractive lure or bait of substantially bird-like shape and having a vertical opening in the body thereof provided with revoluble means for causing the lure to imitate a bird scrambling in the water.

A further object consists in revolubly mounting a paddle wheel or propeller in the vertical opening formed in the body and having its transverse axis positioned below the longitudinal center of the body and the opening. The blades of the paddle wheel are of such length that they extend below the body of the lure, but not above the same. Motion is imparted to the blades by the action of the water as the lure is drawn by the fisherman through the water. The blades constitute climbers or means to facilitate the lure passing over aquatic vegetation and other obstructions that may be in its path, and thus prevent the hooks from being snagged or damaged.

Another object consists in attaching the hooks to opposite sides of the body by the spindle which supports the paddle wheel. Preferably the points of the hooks are arranged to extend forwardly and the barbs rearwardly. In this connection it might be mentioned that contrary to general belief, most fish hit at the side instead of at the bottom of the lure. Consequently, the hooks and barbs are positioned where they will be most efficient in use as the lure travels through the water.

Other objects and advantages will become apparent from the following description when taken in conjunction with the following claims and drawing:

Referring to the drawing in which is shown preferred embodiments of the invention, Figure 1 is a perspective view of a fish lure;

Figure 2 is a plan view of Figure 1;

Figure 3 is a sectional view taken substantially on the line 3—3 of Figure 2 and showing the shanks of the hooks inclined upwardly from the eyes of the hooks;

Figure 4 is a sectional view taken substantially on the line 4—4 of Figure 2;

Figure 5 is a side view of a modified form of the invention.

Referring to the drawing, the body 10 of the lure or bait is preferably of substantially bird-like shape and has a head 11 and a tail 12. The head might be coated or painted the same color as the body or a different contrasting color from that of the body and the tail so as to be more attractive to certain kinds of fish. Thus, the head may be painted red while the body and tail may be yellow. The lure may be made of any suitable material or composition such as wood, plastic or the like.

The body 10 is provided with an elongated vertically disposed through opening 13. Extending transversely through the body and the opening 13 below the longitudinal center thereof is a spindle or threaded retaining bolt 14 (Figure 4) provided at one end with a head 15 having a kerf 16 for receiving a suitable tool, and its opposite end threaded as at 17 to receive the nut 18. As shown, a pair of double or dual hooks 19 are positioned between the outer surface of each side of the body and the head 15 and nut 18, respectively, so that the hooks may be firmly clamped to opposite sides of the body with their barbs 20 extending forwardly or toward the head 11 of the lure. Positioned within the opening 13 and revolubly mounted on the spindle 14 is a paddle wheel or propeller 21 having uniformly spaced blades 22 of the same length. The paddle wheel is shown provided with four blades, but the number may be varied if desired. The blades 22 are of such a length that when the paddle wheel is mounted in the opening 13, the lower blades will extend below the bottom of the body in the manner as clearly indicated in Figures 1 and 3 while the upper blades will be positioned wholly within the body. The head 11 of the lure has extending outwardly therefrom a suitable attaching means such as the eye 23 to which the fishing line 24 may be conveniently connected.

Thus it will be seen that the lure may be used with equal efficiency for fishing in shallow or deep water and that the blades of the paddle wheel, when the lure is drawn through the water will revolve due to the action of the current against their exposed portions so as to cause the lure to pass over weeds, aquatic vegetation and other obstructions in its path. In other words, the paddle wheel constitutes a climber or means for facilitating the lure passing over lily pads, eel grass and the like located in waters where fish generally lie, and which if allowed to collect on the hooks would seriously interfere with the otherwise efficient operation of the lure. The raising of the lure by the paddle wheel also reduces the danger of the hooks being snagged or damaged by contacting hard objects extending upwardly from the bed of the river.

In operation as the lure is drawn through the water, motion is imparted to the paddle wheels by the action of the water and as it encounters the aquatic vegetation or other obstructions the blades, as they rotate, cause the lure to climb over such obstructions and thus prevent the hooks being snagged or the collection of foreign matter thereon. The barbs 20 extend forwardly and are positioned adjacent opposite sides of the body instead of extending downwardly therefrom, since it has been found that most fish hit at the sides of the lure. The hooks and barbs are, therefore, located at the points where fish are most likely to strike and thus substantially increase the efficiency of the lure. As only the lower blades of the paddle wheel are visible in the water, it will be seen that the rotation of the paddle wheel will allow the lure to ride over any obstruction in its path without danger of damaging the hooks. Moreover, the rotation of the blades churns the water below the lure, and this agitation tends to attract the fish since the motion imparted to the lure very closely simulates the action of a bird scrambling in the water.

In Figure 3 the shanks of the hooks 19 are shown inclined upwardly so that the barbs 20, while extending forwardly are also positioned so that they will clear any obstruction that may be encountered by the paddle wheel as the lure passes through the water.

In certain localities, lures can be provided with not more than two hooks and for this reason the modification in Figure 5 may be used. This form of the invention is substantially the same in construction and operation as that previously described, and essentially distinguishes therefrom, in that instead of the spindle 14 which supports the paddle wheel 21 having double or gang hooks secured thereto, it has a hook 25 on each side of the body 26, each hook being provided with a single barb. Each of the hooks 25 is clamped to the body in substantially the same manner as the hooks shown in Figure 4. The barbs 26 extend forwardly and, if desired, hooks 25 may be adjusted so as to assume the position as shown in dotted lines in order to prevent the barbs from extending below the blades of the paddle wheel.

It will be manifest that one or more paddles or propellers 21 may be mounted on the body, and that the hooks may be positioned on the sides or other parts of the lure. While the head 11 and the tail 12 are shown rigid with the body, these parts may be movably connected to the body.

It is to be understood that the forms of the invention shown and described are merely illustrative of preferred embodiments and that such changes may be made as fall within the purview of one skilled in the art without departing from the spirit of the invention and the scope of the following claims:

I claim:

1. An artificial fish lure comprising a substantially bird-like shaped body, said body having an elongated vertically disposed through opening, means revolubly mounted in said opening below the longitudinal center thereof, said means extending below the body but not above the same and arranged to ride over obstructions in the path of the lure, hooks associated with the lure and means securing the hooks to opposite sides of the body, said lure when in motion being constructed and arranged to imitate a bird fluttering in the water.

2. An artificial fish lure comprising a substantially bird-like shaped body, said body having an elongated vertically disposed through opening, a spindle extending transversely through the body and said opening below the longitudinal center thereof, a paddle wheel positioned in said opening and revolubly mounted on the spindle, said paddle wheel arranged to rotate by the action of the water as the lure is drawn through the water, the length of the blades of the paddle wheel being such that they extend below the body but not above the same, the lower extending blades constituting means to facilitate the lure passing over aquatic vegetation and obstructions in its path, and hooks connected to the spindle on opposite sides of the body, said lure when in motion being constructed and arranged to imitate a bird fluttering in the water.

3. An artificial fish lure comprising a substantially bird-like shaped body, said body having an elongated vertically disposed through opening, a spindle extending transversely through the body and said opening below the longitudinal center thereof, a paddle wheel positioned in said opening and revolubly mounted on the spindle, the length of the blades of the paddle wheel being such that they extend below the body but not above the same, the lower extending blades constituting means to facilitate the lure passing over obstructions in its path, and hooks connected to the spindle on opposite sides of the body so that their barbs extend forwardly, the action of the water against the blades causing the lure to simulate a bird fluttering in the water.

4. An artificial fish lure comprising a substantially bird-like shaped body, said body having an elongated vertically disposed through opening, a spindle extending transversely through the body and said opening below the longitudinal center thereof, a paddle wheel positioned in said opening and revolubly mounted on the spindle, the length of the blades of the paddle wheel being such that they extend below the body but not above the same, the lower extending blades constituting means to facilitate the lure passing over aquatic vegetation and obstructions in its path as it is drawn through the water, hooks connected to the spindle on opposite sides of the body so that their barbs extend substantially forwardly, and means for clamping the hooks to the body, the action of the water against the blades causing the lure to simulate a bird fluttering in the water.

5. An artificial fish lure comprising a body having a vertically disposed opening, a revoluble member mounted in said opening and extending below the body, said member arranged to ride over obstructions in the path of the lure and be rotated by the action of the water so as to churn the water below the lure, and hooks extending from opposite sides of the body.

6. An artificial fish lure comprising a body having a vertically disposed opening, a revoluble member mounted in said opening and extending below the body, said member arranged to ride over obstructions in the path of the lure and be rotated by the action of the water so as to churn the water below the lure, hooks extending from opposite sides of the lure, and a common means for supporting the revoluble member and for clamping the hooks to the body.

JOSEPH O'BYRNE.